Aug. 30, 1932.  H. LESLIE  1,874,317
FRUIT BASKET COLLAR
Filed Dec. 23, 1930
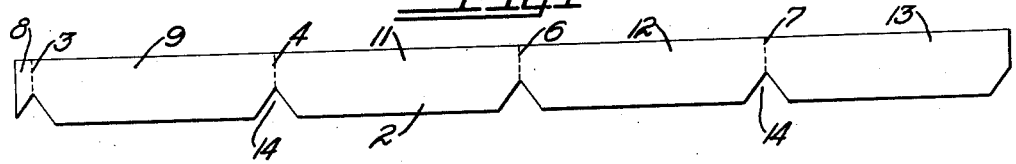
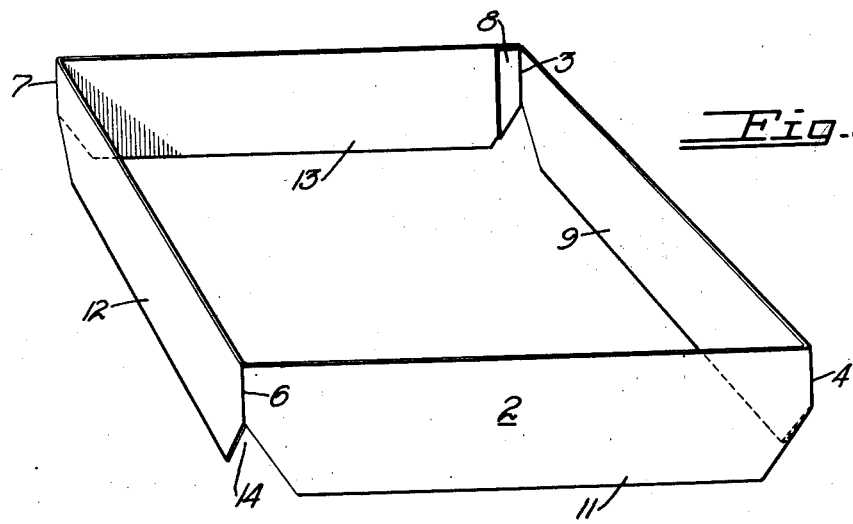
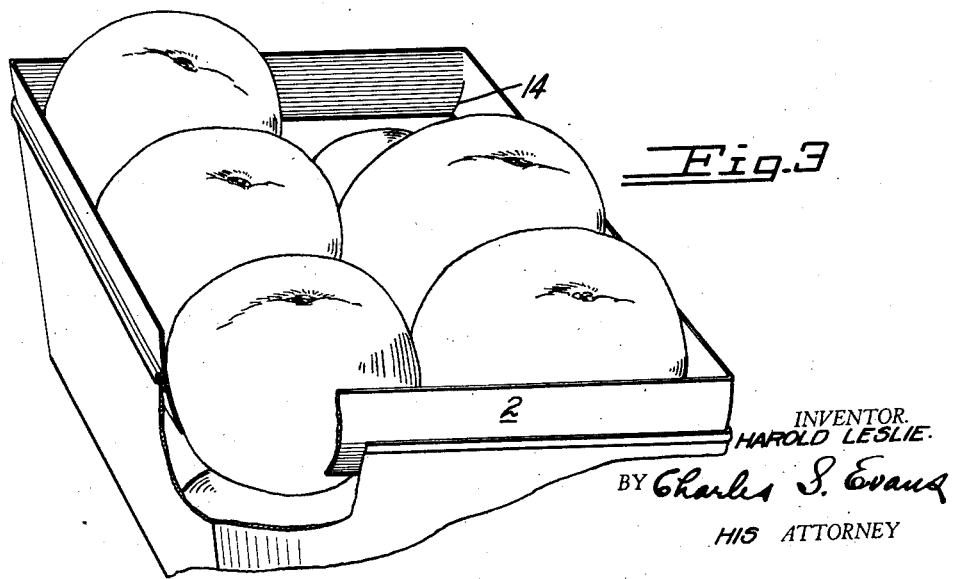
INVENTOR.
HAROLD LESLIE.
BY Charles S. Evans
HIS ATTORNEY Patented Aug. 30, 1932

1,874,317

UNITED STATES PATENT OFFICE

HAROLD LESLIE, OF STOCKTON, CALIFORNIA, ASSIGNOR TO FIBREBOARD PRODUCTS INC., OF SAN FRANCISCO, CALIFORNIA, A CORPORATION OF DELAWARE

FRUIT BASKET COLLAR

Application filed December 23, 1930. Serial No. 504,287.

The invention relates to the art of packing fruits and particularly to a collar for use in fruit baskets.

An object of the invention is the provision of a collar adpated to seat in a fruit container to prevent injury to the fruit.

Another object of the invention is the production of an inexpensive fruit basket collar which because of its particular shape retains its position by the natural resilience of the stock.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a plan view of the flat strip or band comprising the collar.

Figure 2 is a perspective view of the collar showing it folded ready for insertion into a basket.

Figure 3 is a perspective view of the collar arranged in a basket.

Broadly the collar of my invention comprises a strip or band suitably creased and folded so that one edge fits into a fruit basket while the other edge extends above the sides of the basket to prevent injury to the fruit.

In the packing and shipping of fruits having thin and tender skins, such as peaches, pears, plums and apricots considerable loss occurs due to injury inflicted by the upper edge of the fruit baskets. This can only be obviated by keeping the fruit from contacting with the upper edge of the basket and the present invention is designed to accomplish this result.

In greater detail the fruit basket collar of my invention comprises a strip or band 2 cut from fiber board preferably having some resilience and of sufficient strength to retain fruit in a basket. Extending transversely of the strip are creases 3, 4, 6 and 7 which divide the strip into sections 8, 9, 11, 12 and 13. These sections, with the exception of section 8, are preferably slightly longer than the sides of the basket into which they are intended to fit. The small section 8 forms a tab which is preferably adhesively secured to the outer end of the section 13. The tab 8 should be secured on the inside of the section 13 to obviate the danger of being accidently torn loose if caught on the basket when the collar is being inserted; furthermore the collar will fit more snugly into the corner of the basket.

It will be noted that the collar falls into a flat two- or four-layer package so that it is conveniently packed for shipping.

A V-shaped notch 14 extending from one edge of the band and forming flanges on each of the sections is provided on each crease line. The notch extends approximately to the center of the band and the vertex of the V falls on the crease line.

When the collar is to be used it is opened to form a rectangular figure as shown in Figure 2, and the flanges pressed inwardly so that the collar slips down inside the basket. The notches permit the lower portion of the band to assume a pyramidal shape conforming to the shape of the basket. Approximately one-half of the band lies inside the basket while the other half extends above and shields the upper edge of the basket. Because of the resiliency of the fiber board and the nesting or wedge-like action the collar remains securely in position.

The basket is then ready to receive the fruit which is packed in the customary manner. The fruit is shielded from the upper edge of the basket and since the collar extends considerably above it the danger of injury from above is also materially lessened.

I claim:

1. A collar for a fruit basket comprising a band, transverse creases adapted to align with the corners of said basket, and means permitting the nesting of a portion of said collar in said basket to position the middle portion of the collar adjacent the basket edge.

2. A collar for a fruit basket comprising a band, transverse creases adapted to align with the corners of said basket and divide the band into sections, and a flange extending from each section and adapted to engage the sides of the basket to position the middle portion of the collar adjacent the basket edge.

3. A collar for a fruit basket comprising a band, transverse creases adapted to align with the corners of said basket, notches extending into said band on each crease to form flanges adapted to engage the sides of the basket to hold the upper edge of the band above the edge of the basket.

In testimony whereof, I have hereunto set my hand.

HAROLD LESLIE.